United States Patent [19]

Marcolina et al.

[11] 4,142,320
[45] Mar. 6, 1979

[54] ANIMAL TRAP AND TRAPPING METHOD

[76] Inventors: Gene A. Marcolina, 8803 Cheltenham Ave., Wyndmoor, Pa. 19118; Gordon D. Holl, Kenas Rd., North Wales, Pa. 19454

[21] Appl. No.: 765,261

[22] Filed: Feb. 3, 1977

[51] Int. Cl.² .......................................... A01M 23/02
[52] U.S. Cl. .................................................. 43/61
[58] Field of Search ................................ 43/58, 60, 61

[56] References Cited

U.S. PATENT DOCUMENTS

| 441,677 | 12/1890 | Lovell | 43/58 |
|---|---|---|---|
| 443,975 | 12/1890 | Pead | 43/61 |
| 1,372,663 | 3/1921 | Albers et al. | 43/61 |
| 1,454,998 | 5/1923 | Haege | 43/61 |
| 2,793,464 | 5/1957 | Bird | 43/61 |
| 3,177,608 | 4/1965 | Lindelon | 43/61 |
| 3,426,470 | 2/1969 | Rudolph | 43/61 |
| 3,733,735 | 5/1973 | Hirsch | 43/61 |
| 3,975,857 | 8/1976 | Branson et al. | 43/61 |

Primary Examiner—Edward M. Coven
Attorney, Agent, or Firm—George A. Smith, Jr.

[57] ABSTRACT

A disposable mousetrap comprises an elongated plastic housing having an air-tight swinging door biased toward its closed condition by a rubber band. An articulated arm extends from the door to the floor of the housing and then to a detent located near the rear of the interior of the housing. A trigger for disengaging the arm from the detent is secured to the arm at the end of the arm which is remote from the door. This structure, and particularly the articulated arm, allows all of the parts of the trap except for the rubber band to be injection molded as a unit.

18 Claims, 7 Drawing Figures

ANIMAL TRAP AND TRAPPING METHOD

SUMMARY OF THE INVENTION

This invention relates to animal traps, and particularly to traps of the type which operate by imprisoning the animal within an enclosure.

Traps of the imprisonment type are described in U.S. Pat. No. 3,177,608 dated Apr. 13, 1965 and U.S. Pat. No. 3,823,504 dated July 16, 1974. While imprisonment-type traps are known, as demonstrated by these and other patents, the most widely used trap for mice is still the familiar smiting trap comprising a wooden base with a swinging striker consisting of a spring-loaded wire rectangle.

Unfortunately the smiting traps, while effective, often produce results which are somewhat repugnant. The user must handle the dead mouse in order to remove it from the trap, and is frequently required to clean up mouse blood. Despite these drawbacks of the smiting traps, imprisoning traps have not met with substantial success as an alternative means of controlling mice. While the exact reasons are not known, it can be surmised that the lack of success of imprisonment-type traps is due to several factors. In most cases, the user is required to view or handle the dead mouse at least to some extent. Secondly, in most cases the trap does not automatically kill the mouse, and consequently, the user must carry out the killing as a separate step. Finally, imprisonment-type traps are expensive and must be reused to be practical; consequently, they must be cleaned periodically.

The principal object of this invention is to provide a successful disposable mousetrap which is not subject to any of the aforementioned drawbacks.

In accordance with the invention, a mousetrap which is effective, yet sufficiently inexpensive to be considered disposable, is constructed as follows. The mousetrap comprises an elongated housing of synthetic plastic, having an entrance opening at one of its ends. A synthetic plastic swinging door is integrally molded with the housing, and adapted to close the entrance opening and thereby form, with the housing, a substantially air-tight enclosure. Means, such as a rubber band, are provided for urging the door toward its closed condition. An elongated, synthetic plastic arm is integrally molded with the housing and the door, is secured at one of its ends to the door, and extends through the entrance opening into the interior of the elongated housing. An integrally molded detent is provided as part of a wall of the housing on the inside, and is engageable by means integrally molded at the end of the arm opposite the end which is secured to the door. When the arm engages the detent, it prevents the door from closing. In its preferred form the trap comprises an animal-actuable trigger integrally molded at the end of the arm opposite the end which is secured to the door. When actuated, the trigger disengages the arm from the detent so that the door closes under the influence of the rubber band or other urging means. Since the trigger, and all other parts except for the rubber band are integrally molded, the trap can be made by injection molding, and therefore can be produced in quantity at costs which make disposability feasible.

In the preferred form of the trap, the elongated arm is of a length such that it extends substantially to the end of the housing opposite the entrance opening when the door is closed. The arm is articulated so that it can be molded while outside the housing and thereafter caused to enter the housing through the entrance opening. By using an elongated housing and an articulated arm, in this manner, it is possible to produce an injection molded trap while minimizing the air content of the trap by positioning the trigger at the far end of the trap opposite the entrance.

A reduction in the size of the trap and in its air content is also realized by constructing the trap so that when the forward end of the mouse is in contact with the trigger, a portion of the tail extends outwardly through the entrance opening. With this construction, when the door closes, the mouse's tail is pinched, and the mouse withdraws its tail into the enclosure allowing the door to close completely.

While the invention has particular utility as a disposable mousetrap, it embodies many other features having more general applicability to animal traps, all of which features and their objects will be apparent from the following detailed description.

DETAILED DESCRIPTION

Figure 1:
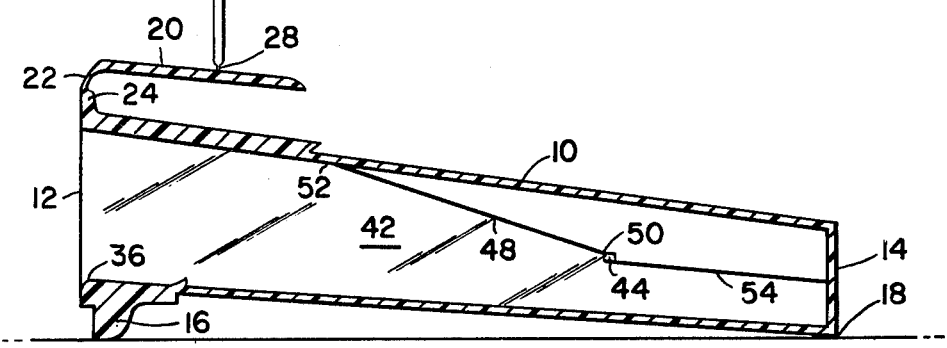
FIG. 1 is a vertical section taken longitudinally through a first embodiment of the trap, illustrating the trap, as removed from the injection molding die.

The first version of the trap, as shown in FIG. 1, is made entirely from a synthetic plastic of a type which can be injection molded, and which lends itself to the formation of flexible hinges by providing narrowed interconnections between parts. Polyethylene and polypropylene are examples of a wide variety of suitable materials.

Figure 3:
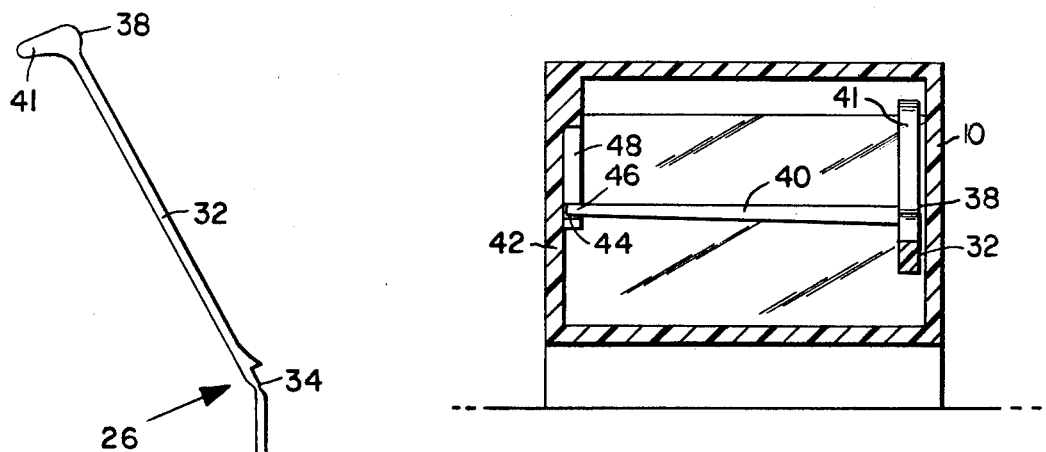
FIG. 3 is a vertical section taken on the plane 3—3 of FIG. 2.

The trap comprises an elongated housing 10 having an entrance opening 12 at its left-hand end. Preferably, the housing is slightly tapered from opening 12 toward the opposite end wall 14. The transverse cross section (as illustrated in FIG. 3) is preferably of a generally rectangular configuration, though it is possible to use various other cross-sectional shapes.

The wall of housing 10 can be quite thin, and thicknesses of 0.05 inch are more than adequate. The portions of the housing near the entrance opening, however, are desirably somewhat thicker than the remaining portions of the housing walls, as they must support the rubber band under tension, and must also support the door hinge at some distance away from the top of the entrance opening, and also provide a seal against the entry of air when the door is closed. A pedestal 16 is formed on the underside of the trap housing near the entrance opening for the purpose of maintaining the entrance opening in a raised condition to prevent the edge of the door from coming into contact with the floor. The trap is supported between pedestal 16 and corner 18 at the far end of the trap.

A swinging door 20, which is integrally molded with housing 10, is hinged to the main body of the housing at 22, a narrow hinge section being formed in the injection molding process. Desirably, hinge 22 is formed along the upper edge of a flange 24 formed along the top of the housing above the entrance opening. Flange 24 facilitates molding of the trap, and also provides a relatively wide border around entrance opening 12 to facilitate sealing of the entrance opening by the door to prevent the entry of air into the trap. Door 20 is adapted to swing down and close the entrance opening to form, with the housing a substantially air-tight enclosure.

An elongated, synthetic plastic arm, generally indicated at 26, is integrally molded with the door, so that the housing, the arm and the door are all integrally molded together. The arm is secured to the upper side of the door, as viewed in FIG. 1, by means of a hinge 28 which is produced by the formation of a narrowed portion in the molding process. The arm consists of a pair of sections 30 and 32 connected together by another narrowed hinge portion 34 to form an articulated arm. As will be apparent from an inspection of FIGS. 1 and 2, the articulation of the elongated arm 26 permits the housing, door and arm to be integrally molded while the arm is outside of the housing, substantially in the position illustrated in FIG. 1. Thereafter, the arm can be folded so that it enters the housing through entrance opening 12 and assumes the position illustrated in FIG. 2. Because of the articulation of the arm, it can be molded integrally with the door and housing, yet it can be sufficiently long to extend substantially to the far end of the narrow housing opposite entrance opening 12 when the door is closed. This allows the housing to be relatively long and narrow, as shown, and positions the trigger mechanism well toward the rear of the housing, all of which provides for a minimum air content within the enclosure when the door is closed.

In the preferred form of the invention as shown in FIG. 1, in order to allow arm 26 to enter the interior of the housing, the length of arm section 30 between hinge 28 and intermediate hinge portion 34 should be less than the maximum distance between the floor of the housing at the bottom edge 36 of the entrance opening and the point at which section 30 is secured to door 20 by hinge 28. The length of section 32 of the arm is then made sufficiently long to allow the arm to extend nearly to the rear of the interior of the trap when the door is closed.

Hinges 28 and 34 are preferably sufficiently stiff to cause the arm as a whole to assume the condition shown in FIG. 1. Furthermore, the hinges should be sufficiently stiff to impart a resiliency to the arm, especially at hinge 34 so that, following an attempt to straighten out the arm, arm section 32 would rotate counterclockwise about hinge 34 under the influence of the hinge's resilience, and return to the condition shown.

End 38 of arm section 32 is provided with a transverse bar 40 (FIG. 3) which is integrally molded with the arm, and which extends substantially across the entire width of the interior of the trap when the arm section 32 is positioned adjacent the right-hand vertical wall, as shown in FIG. 3.

Arm section 32 is also provided with an upwardly extending projection 41, which, as shown in FIG. 3, contacts the top wall of the housing in order to limit the upward movement of arm end 38.

The left-hand wall 42 of the housing is provided with an integrally molded detent comprising surface 44 (FIG. 1). Surface 44 lies in a vertical plane, though the plane is preferably oblique with respect to the longitudinal axis of the trap. Detent surface 44 is engageable by the end 46 of bar 40, as shown in FIG. 3, the engagement of the end of the bar with the detent surface acting to prevent door 20 from closing. As will be seen, bar 40 acts as a trigger, and when it is moved by an animal, end 46 of the bar becomes disengaged from detent surface 44 so that the door closes under the influence of the rubber band, or other device used to urge the door in the closing direction. Preferably, the trap is constructed so that, when set, the distance between trigger bar 40 and end wall 14 is a minor portion of the overall length of the housing measured between wall 14 and opening 12. When the door is closed, the trigger bar is positioned adjacent end wall 14, a small space being provided, if desired, so that pieces of bait do not interfere with the proper closing of the trap.

When the trap is being set, end 46 of arm 40 is guided toward detent surface 44 by a downwardly facing ridge 48 which is integrally formed in side wall 42. This ridge is continuous from point 50, immediately adjacent detent surface 44, to a point 52 which is both vertically spaced above detent surface 44 and located between entrance opening 12 and the detent surface, so that it guides the end of bar 40 downwardly into engagement with detent surface 44. The resiliency of the arm imparted to it by hinge 34 causes end 46 of bar 40 to engage and follow ridge 48, or at least a part thereof close to detent 44, as the trap is being set. Another substantially horizontal ridge 54 extends from the lower part of detent surface 44 to the end wall 14 of the trap. Ridge 54, however, is only present for convenience in molding.

Figure 2:
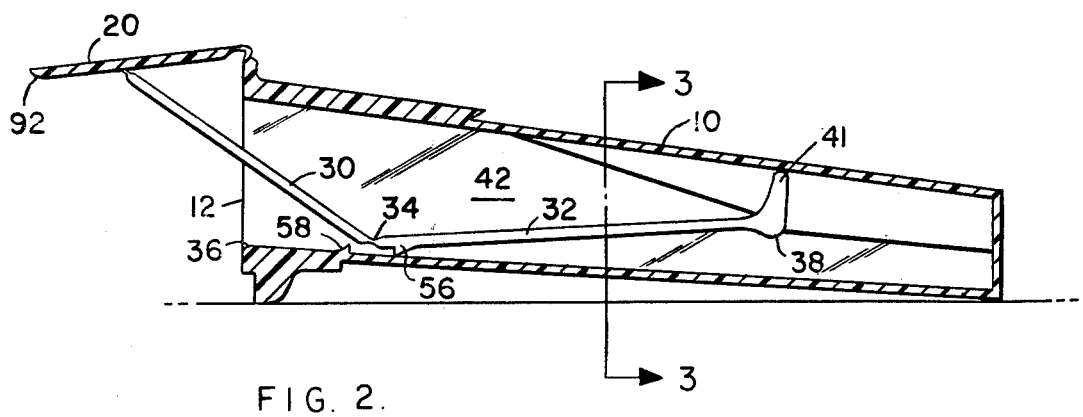
FIG. 2 is a vertical section showing the same trap in its set condition.

FIG. 2 shows the trap in its set position. A spur 56 projecting downwardly from section 32 of the arm near hinge 34 cooperates with an upwardly extending projection 58 on the floor of the housing. Spur 56 and projection 58, acting together, constitute a latch which limits reverse movement of the arm when the trap is in the set position. This latch prevents the animal from pulling backwardly on trigger bar 40 to such an extent that arm section 32 would extend through opening 12 and thereby disable the trap.

Figure 4:
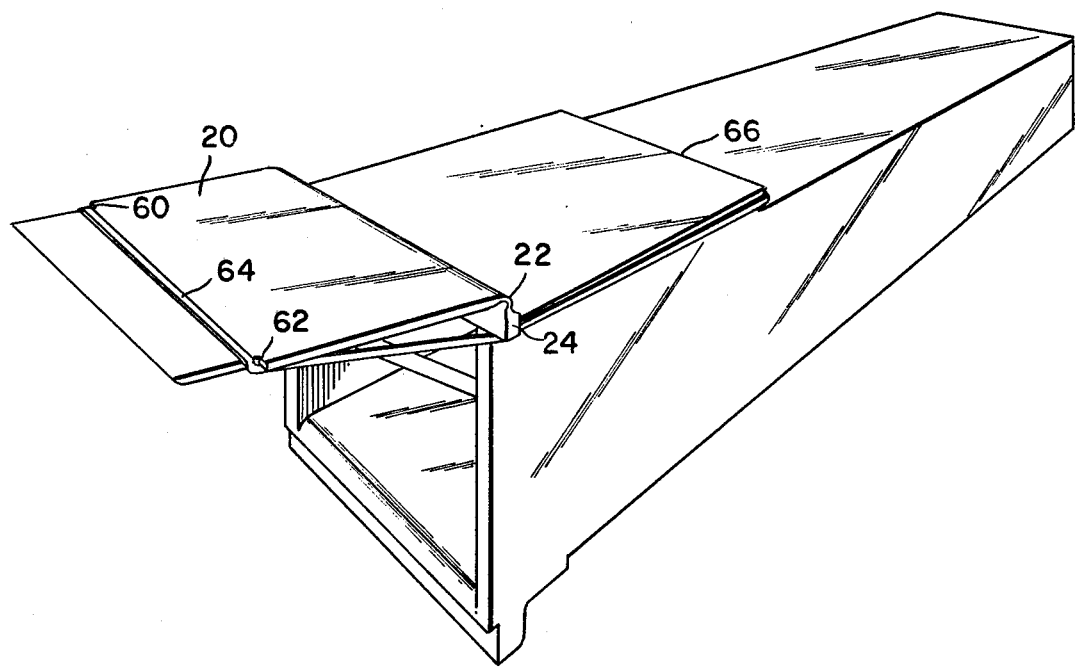
FIG. 4 is a perspective view showing the outside of the trap in its set condition.

The configuration of door 20 is best seen in FIG. 4. The hinge 22 and flange 24 are slightly longer than the width of the housing, and extend beyond the wall of the housing on both sides. The major part of door 20 is as wide as hinge 22. However, the end of door 20 remote from hinge 22 is narrowed in order to form steps 60 and 62 for retaining rubber band 64. The rubber band is a continuous loop, and extends as shown over the top of the door, underneath the parts of flange 24 which extend beyond the side walls of the housing, and around shoulder 66 which is formed in the roof of the housing.

Figure 5:
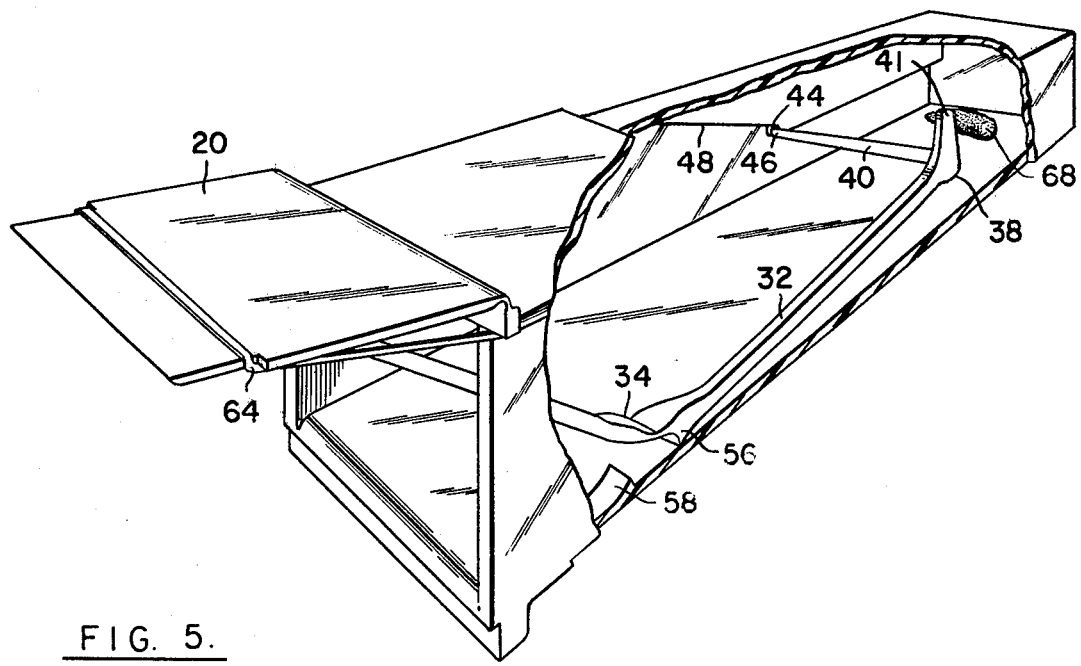
FIG. 5 is a partially cut-away perspective view of the trap in its set condition, illustrating the trigger.

Operation of the trap can be best appreciated from the partially cut-away perspective view in FIG. 5. As the mouse enters the trap and approaches bait 68 at the far end of the trap, it encounters trigger bar 40. A slight downward push on the trigger bar disengages end 46 of the trigger bar from detent surface 44, allowing the door to close under the influence of rubber band 64. As the trap is substantially air-tight, the mouse is quickly asphyxiated.

Figure 6:
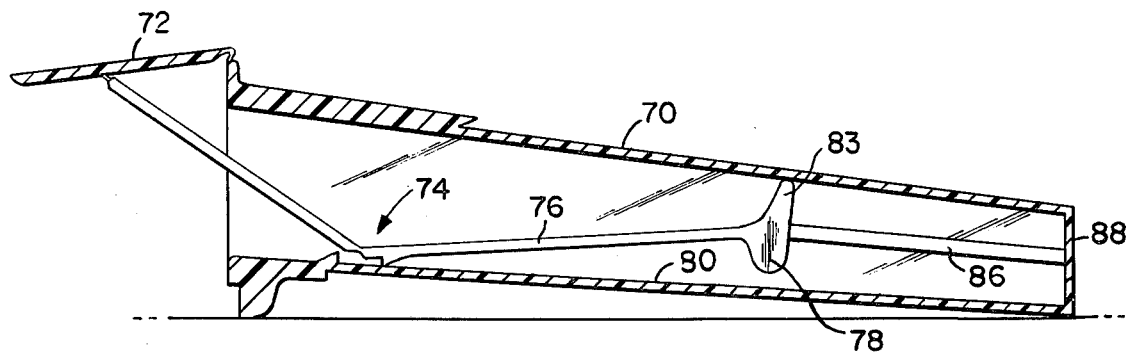
FIG. 6 is a longitudinal section showing a second embodiment of the trap in its set condition.
Figure 7:
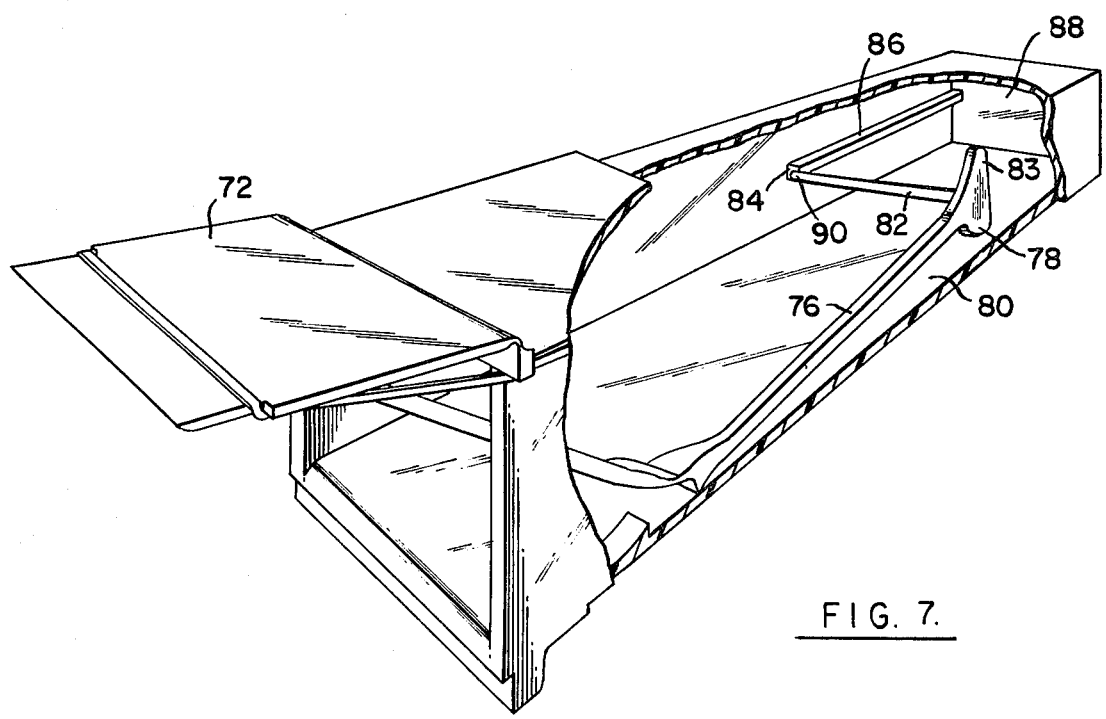
FIG. 7 is a partially cut-away perspective view of the trap of FIG. 6.

An alternate version of the trap is shown in FIGS. 6 and 7. This version does not require a resilient hinge at the intermediate portion of the arm. This trap comprises a housing 70, having a door 72 and an articulated arm 74. It is generally similar to the trap of FIGS. 1-5 except in the configuration of the end of the articulated arm, and in the configuration of the detent.

The end of arm section 76 is provided with a downwardly extending foot 78 which rides on the floor 80 of the housing, as the trap is being set, and maintains trigger bar 82 at a constant height. An upwardly extending projection 83 is provided to contact the top wall of the housing and thereby limit upward movement of the end of arm section 76 under the influence of the rubber band while the trap is in the set condition.

A detent surface is provided at 84, and although a sloping guide ridge corresponding to ridge 48 (FIG. 1) can be provided, it is possible to eliminate the guide ridge. The detent surface 84 is formed at the end of a rail 86 which extends to the rear wall 88 of the housing for convenience in molding.

Disengagement of end 90 of trigger bar 82 from detent surface 84 takes place by virtue of a twisting action of arm 74 as the trigger bar is moved either upwardly or downwardly. When the disengagement takes place, door 72 closes in the same manner as door 20 in FIG. 2.

An important aspect of the invention resides in the discovery that a mouse will pull its tail inside the trap when it is pinched between the bottom of the door and the edge of the entrance opening. In order to facilitate this action, the edge of the door is rounded at 92 (FIG. 2), and the bottom edge 36 of entrance opening 12 is also rounded. The trap is constructed so that trigger bar 40, when set, is located at a distance from entrance opening 12 such that when a mouse is in a position to actuate the trigger bar with its mouth, foreleg or another part of its forward end, a portion of its tail extends outwardly through the entrance opening so that when the door is closed, the tail is pinched. Since the mouse will invariably draw its tail inwardly when it is pinched, the internal volume of the trap can be made quite small, with the consequent reduction of the volume of air contained within the trap and reduction of the time required to kill the mouse.

In the operation of either of the above-described embodiments of the trap, bait, such as a piece of cheese or any other substance which will cause a mouse to enter the enclosure, is placed inside the trap at the far end opposite the entrance opening, or alternatively impaled or rubbed on the trigger bar. The trap is then set by folding the articulated arm and causing the end carrying the trigger bar to enter the trap through the entrance opening. A rubber band is positioned on the trap in the manner illustrated in FIG. 4, and the door is slowly permitted to swing in the closing direction until the end of the trigger bar engages the detent surface on the wall of the trap. The trap then remains in its set condition until the trigger bar is actuated by a mouse trying to reach the bait.

As soon as the trigger bar is actuated, the door closes. When the door closes on the mouse's tail, the mouse reacts by pulling its tail completely inside the trap between the rounded surfaces at the lower edge of the door and the lower edge of the entrance opening. This allows the door to close substantially completely, cutting off the supply of air. It has been found that successful traps in accordance with the invention can be made in such sizes that they contain a very small volume of air, and therefore asphyxiate a mouse within a matter of a few minutes.

The user, finding a trap in its tripped condition, simply disposes of the entire trap, containing the mouse, by throwing it in the trash or burning it. While the trap can be made from transparent or opaque plastic, it is desirably semi-opaque, so that the user can easily ascertain the presence of a dead mouse without being revolted.

The trap in accordance with the invention can be made in appropriate sizes to trap other rodents such as rats, and other larger animals. In some cases, it is desirable not to kill the animal, in which event, one or more air openings can be provided in the roof or side walls of the trap to allow the animal to breathe.

Other modifications can be made to the trap as shown. For example, the detent surface could be formed on the side wall adjacent which the articulated arm is positioned rather than on the opposite side wall. In addition, in some cases various arm configurations other than those specifically disclosed can be used. For example, in some cases, especially in the case of larger traps which could be reused, the arm and the door could be molded separately and secured to each other by a projection on the arm and a hole in the door adapted to snap together. Numerous other modifications can be made without departing from the scope of the invention as defined in the following claims.

We claim:

1. A disposable mousetrap comprising:

means providing an elongated housing of synthetic plastic, having an entrance opening at one of its ends;

means providing a synthetic plastic swinging door, integrally molded with the housing, and adapted to close the entrance opening and thereby form with said housing a substantially air-tight enclosure;

means for urging the door toward its closed condition;

an elongated synthetic plastic arm integrally molded with the housing and the door, secured at one of its ends to the door, and extending through the entrance opening into the interior of the elongated housing;

detent means within the elongated housing;

means carried at the opposite end of the arm for engaging the detent means to prevent said door from closing; and animal-actuable trigger means carried at said opposite end of the arm for disengaging the arm from said detent means whereby the door closes under the influence of said urging means;

in which the elongated arm is hinged both where it is secured to the door and at an intermediate point, the arm being adapted to extend from the door to the floor of the housing and thence to the detent means when the detent means is engaged by the detent-engaging means at said opposite end of the arm, and in which the door providing means is hinged to the housing-providing means adjacent the edge of the entrance opening opposite said floor, the length of the portion of the arm extending between the door and the intermediate point is less than the maximum distance between the floor of the housing at the entrance opening and the point at which the arm is secured to the door, and the length of the portion of said arm between said intermediate point and said opposite end is at most equal to the maximum distance between the floor of the housing at the entrance opening and said intermediate point, whereby the arm can be molded while outside the housing and thereafter caused to enter the housing through its entrance opening.

2. A mousetrap according to claim 1 in which said detent means is an integrally molded part of the wall of the housing.

3. A mousetrap according to claim 1 in which said means for engaging the detent means is integrally molded with the arm.

4. A mousetrap according to claim 1 in which said trigger means is integrally molded with the arm.

5. A mousetrap according to claim 1 in which said detent means is an integrally molded part of the wall of the housing, said means for engaging the detent means is integrally molded with the arm, and said trigger means is integrally molded with the arm.

6. A trap comprising:
means providing an elongated housing having an entrance opening at one of its ends;
means providing a door adapted to close the entrance opening;
means for urging the door toward its closed condition;
an elongated arm secured at one of its ends to the door, and extending through the entrance opening into the interior of the elongated housing;
detent means within the elongated housing;
means at the opposite end of the arm for engaging the detent means to prevent the door from closing; and
animal-actuable trigger means secured to said opposite end of the arm for disengaging the arm from the detent means whereby the door closes under the influence of said urging means;
in which the detent means is located above the floor of the housing and is integrally formed in a side wall thereof, and having a ridge integrally formed in said side wall and extending as a continuous ridge from a point immediately adjacent said detent means to another point between said entrance opening and said detent means, and having means for resiliently urging the detent-engagement means vertically against said ridge, whereby said ridge acts to guide the detent-engaging means into engagement with said detent means as the trap is being set.

7. A trap according to claim 6 in which said point between said entrance opening and said detent means is vertically spaced from said detent means.

8. A trap according to claim 6 in which said point between said entrance opening and said detent means is located substantially at the upper edge of said side wall.

9. A trap comprising:
means providing an elongated housing having an entrance opening at one of its ends;
means providing a door adapted to close the entrance opening;
means for urging the door toward its closed condition;
an elongated molded plastic arm secured at one of its ends to the door, and extending through the entrance opening into the interior of the elongated housing;
detent means within the elongated housing;
means at the opposite end of the arm for engaging the detent means to prevent the door from closing; and
said arm including animal-actuable trigger means integrally molded as part of said opposite end of the arm for disengaging the arm from the detent means when actuated whereby the door closes under the influence of said urging means;
in which the elongated housing includes means providing a floor, means providing a pair of opposed side walls extending upwardly from the floor, and a top wall, and in which the elongated arm extends along one of said side walls, and the animal-actuable trigger means comprises a bar extending from the arm across the interior of the housing.

10. A trap according to claim 9 in which the detent means is located on the side wall opposite said one of said side walls, and in which the means for engaging the detent means is located at the end of said bar remote from said arm.

11. A trap according to claim 9 having a downwardly extending foot at said opposite end of said arm adapted to ride on said floor as the trap is being set, thereby maintaining said trigger means at a constant height.

12. A trap according to claim 9 having an upwardly extending projection at said opposite end of said arm adapted to contact said top wall of the housing, thereby limiting upward movement of said opposite end of the arm under the influence of said urging means while the trap is in the set condition.

13. A trap according to claim 9 having a first latching means fixed to the interior of the housing and second latching means fixed to said arm, said first and second latching means having surfaces adapted to engage each other upon movement of the detent-engaging means away from the detent means toward the entrance opening, thereby limiting reverse movement of the elongated arm when the trap is in the set condition.

14. A mousetrap comprising:
means providing an elongated housing having an entrance opening at one of its ends;
means providing a door adapted to close the entrance opening, said housing and said door forming a substantially air-tight enclosure when said door is closed;
means for urging the door toward its closed condition;
triggerable means for normally holding said door in its open condition, and triggerable to permit said door to move in its closing direction under the influence of said urging means;
animal-actuable means located within the elongated housing for effecting triggering of said triggerable means when actuated by the forward end of a mouse, the distance between said animal-actuable means and the end of the housing opposite the entrance opening constituting a minor portion of the length of the housing; and
said animal-actuable means being located at a distance from the entrance opening such that when a mouse is in a position to actuate said animal-actuable means with its forward end, a portion of its tail extends outwardly through said entrance opening whereby, when the door is closed, the tail is pinched between the door and an edge of the entrance opening, causing the mouse to withdraw its tail entirely into the enclosure and permitting the door to close substantially completely.

15. A mousetrap according to claim 14 in which the door is hinged at the top of the entrance opening, and in which the edge of the entrance opening opposite the hinge is rounded.

16. A mousetrap according to claim 14 in which said door is hinged at the top of the entrance opening and in which the edge of the door opposite the hinge is rounded.

17. A mousetrap according to claim 14 in which said door is hinged at the top of the entrance opening and in which the edge of the door opposite the hinge and the edge of the entrance opening opposite the hinge are both rounded.

18. A method of trapping and killing a mouse comprising the steps of:

providing an elongated enclosure having an entrance opening and a door arranged to close the entrance opening to provide a substantially air-tight enclosure;

setting an animal-actuable trigger to hold said door in an opened condition said trigger being positioned, when set, at a location within said enclosure such that the distance between the trigger and the entrance opening is such that when the mouse is in a position to actuate the trigger with its forward end, a portion of its tail extends outwardly through the entrance opening, and the distance between the trigger and the end of the enclosure opposite the entrance opening constitutes a minor portion of the length of the housing;

enticing the mouse to enter the enclosure through the entrance opening and actuate the trigger; and when the mouse actuates the trigger, urging said door in the closing direction by resilient urging means while the mouse's tail extends through the entrance opening, thereby pinching the mouse's tail between the door and an edge of the entrance opening and causing the mouse to withdraw its tail entirely into the enclosure, thereby allowing the door to close substantially completely;

whereby the mouse is killed by asphyxiation.

* * * * *